(12) United States Patent
Gonzalez-Carlo (10) Patent No.: US 8,575,775 B1
(45) Date of Patent: Nov. 5, 2013

(54) ELECTRICAL POWER GENERATION SYSTEM FOR HARVESTING UNDERWATER CURRENTS

(76) Inventor: Julio Gonzalez-Carlo, Miami, FL (US)

( * ) Notice: Subject to any disclaimer, the term of this patent is extended or adjusted under 35 U.S.C. 154(b) by 453 days.

(21) Appl. No.: 13/051,724

(22) Filed: Mar. 18, 2011

Related U.S. Application Data (63) Continuation-in-part of application No. 12/207,174, filed on Sep. 9, 2008, now Pat. No. 7,928,595.

(60) Provisional application No. 60/973,705, filed on Sep. 19, 2007.

(51) Int. Cl.
*F03B 13/00* (2006.01)

(52) U.S. Cl.
USPC ............................................. 290/54; 290/53

(58) Field of Classification Search
USPC ..................................................... 290/54, 53
See application file for complete search history.

(56) References Cited

U.S. PATENT DOCUMENTS

| | | | |
|---|---|---|---|
| 3,978,345 A * | 8/1976 | Bailey ............................. | 290/54 |
| 4,026,587 A | 5/1977 | Hultman | |
| 4,034,231 A | 7/1977 | Conn et al. | |
| 4,256,970 A | 3/1981 | Tomassini | |
| 4,335,319 A | 6/1982 | Mettersheimer, Jr. | |
| 4,368,392 A * | 1/1983 | Drees ............................. | 290/54 |
| 4,686,376 A | 8/1987 | Retz | |
| 5,009,568 A | 4/1991 | Bell | |
| 5,440,175 A * | 8/1995 | Mayo et al. ..................... | 290/54 |
| 5,440,176 A | 8/1995 | Haining | |
| 5,789,826 A * | 8/1998 | Kumbatovic ................... | 290/53 |
| 6,006,518 A | 12/1999 | Geary | |
| 6,104,097 A | 8/2000 | Lehoczky | |
| 6,652,221 B1 | 11/2003 | Praenkel | |
| 6,856,036 B2 | 2/2005 | Belinsky | |
| 6,982,498 B2 | 1/2006 | Tharp | |
| 6,995,479 B2 | 2/2006 | Tharp | |
| 7,036,449 B2 | 5/2006 | Sutter | |
| 7,042,114 B2 | 5/2006 | Tharp | |
| 7,105,942 B2 | 9/2006 | Henriksen | |

(Continued)

FOREIGN PATENT DOCUMENTS

WO     WO8101539     6/1981

OTHER PUBLICATIONS

Barbara Barrett; Latest U.S. Energy Plan: Use Power of Oceans; MiamiHerald.com; Posted Nov. 6, 2007; 3 Pages.

(Continued)

*Primary Examiner* — Michael Zarroli
(74) *Attorney, Agent, or Firm* — Neustel Law Offices (57) ABSTRACT

An electrical power generation system for harvesting underwater river currents which generally includes one or more flotation members, a platform connected to the flotation members such that the platform is supported at least partially above a water surface of a river, at least one turbine extending below the platform, wherein the at least one turbine is positioned within an underwater current stream and generally comprised of an inverted wind turbine structure, at least one electrical generator positioned upon the platform and mechanically connected to the turbine to receive the rotational torque to be converted to electrical energy, wherein the electrical energy is transferred to an electrical grid distribution system, and an anchoring system having a rigid stabilization rod pivotally connected on each end for securing the platform to the embankment such as to permit the platform to rise and fall with the water surface of the river.

18 Claims, 8 Drawing Sheets

(56) References Cited

U.S. PATENT DOCUMENTS

| | | |
|---|---|---|
| 7,114,882 B1 | 10/2006 | Friedmann |
| 7,190,087 B2 | 3/2007 | Williams |
| 7,215,036 B1 | 5/2007 | Gehring |
| 7,239,037 B2 | 7/2007 | Alstot |
| 7,279,803 B1 | 10/2007 | Bosley |
| 7,352,078 B2 | 4/2008 | Gehring |
| 7,487,637 B2 * | 2/2009 | Buttler .......................... 60/495 |
| 7,602,076 B1 * | 10/2009 | Sipp .............................. 290/54 |
| 7,661,922 B2 | 2/2010 | Belinsky |
| 7,768,145 B2 | 8/2010 | Susman et al. |
| 2005/0001432 A1 | 1/2005 | Drentham Susman et al. |
| 2005/0285407 A1 | 12/2005 | Davis et al. |
| 2006/0008351 A1 | 1/2006 | Belinsky |
| 2007/0085345 A1 | 4/2007 | Brown |
| 2007/0207028 A1 | 9/2007 | Nicholas et al. |

OTHER PUBLICATIONS

Cammy Clark; Keys Man's Dream: Harnessing the Tides; MiamiHerald.com; Posted Nov. 12, 2007; 3 Pages.
Cammy Clark; Keys Resident Hopes to Tap Ocean's Power; MiamiHerald.com; Posted Nov. 13, 2007; 3 Pages.

\* cited by examiner

ELECTRICAL POWER GENERATION SYSTEM FOR HARVESTING UNDERWATER CURRENTS

CROSS REFERENCE TO RELATED APPLICATIONS

I hereby claim benefit under Title 35, United States Code, Section 120 of U.S. patent application Ser. No. 12/207,174 filed Sep. 9, 2008, issued as U.S. Pat. No. 7,928,595. This application is a continuation in-part of the application Ser. No. 12/207,174. The application Ser. No. 12/207,174 is currently issued and waiting to be granted. The application Ser. No. 12/207,174 is hereby incorporated by reference into this application. The application Ser. No. 12/207,174 also claims priority from U.S. provisional patent application Ser. No. 60/973,705 filed Sep. 19, 2007. Thus, the 60/973,705 application is also hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to renewable energy sources and more specifically it relates to an electric power generation system for efficiently harvesting underwater river current energy.

2. Description of the Related Art

Any discussion of the related art throughout the specification should in no way be considered as an admission that such related art is widely known or forms part of common general knowledge in the field.

The need and desire for renewable energy sources has become increasingly abundant with various well-known and publicized facts, such as climate change, global pollution and our nation's dependence upon foreign oil. Some renewable energy sources that are known to produce electric power include wind, tidal streams, hydroelectric, geothermal and solar. Hydroelectric power sources, such as from the Gulf Stream currents are generally constant sources and if effectively utilized and harnessed would produce an efficient means of producing electrical power.

Various hydroelectric systems are known that describe and show methods of producing electrical power from ocean currents. However, none of the prior hydroelectric systems are currently built in such a manner as to render the system substantially impervious to natural disasters, such as hurricanes, and also offer an aesthetically pleasing structure above the water surface. Because of the inherent problems with the related art, there is a need for a new and improved electric power generation system for efficiently harvesting underwater current energy.

BRIEF SUMMARY OF THE INVENTION

A system for efficiently harvesting underwater river current energy. The invention generally relates to a renewable energy source which includes one or more flotation members, a platform connected to the flotation members such that the platform is supported at least partially above a water surface of a river, at least one turbine extending below the platform, wherein the at least one turbine is positioned within an underwater current stream and generally comprised of an inverted wind turbine structure, at least one electrical generator positioned upon the platform and mechanically connected to the turbine to receive the rotational torque to be converted to electrical energy, wherein the electrical energy is transferred to an electrical grid distribution system, and an anchoring system having a rigid stabilization rod pivotally connected on each end and for securing the platform to the embankment such as to permit the platform to rise and fall with the water surface of the river.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
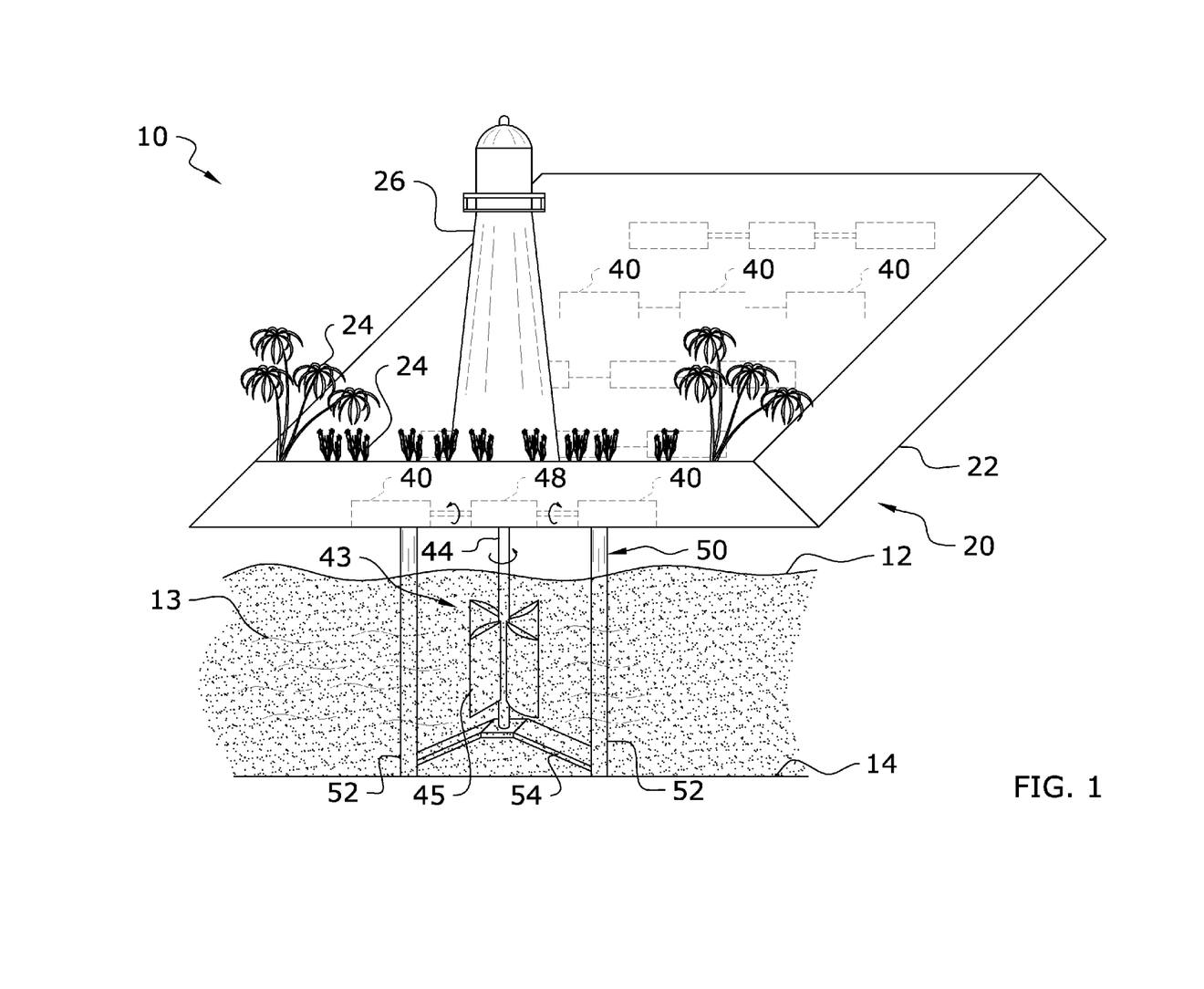
FIG. 1 is a first exemplary embodiment of the present invention.
Figure 2:
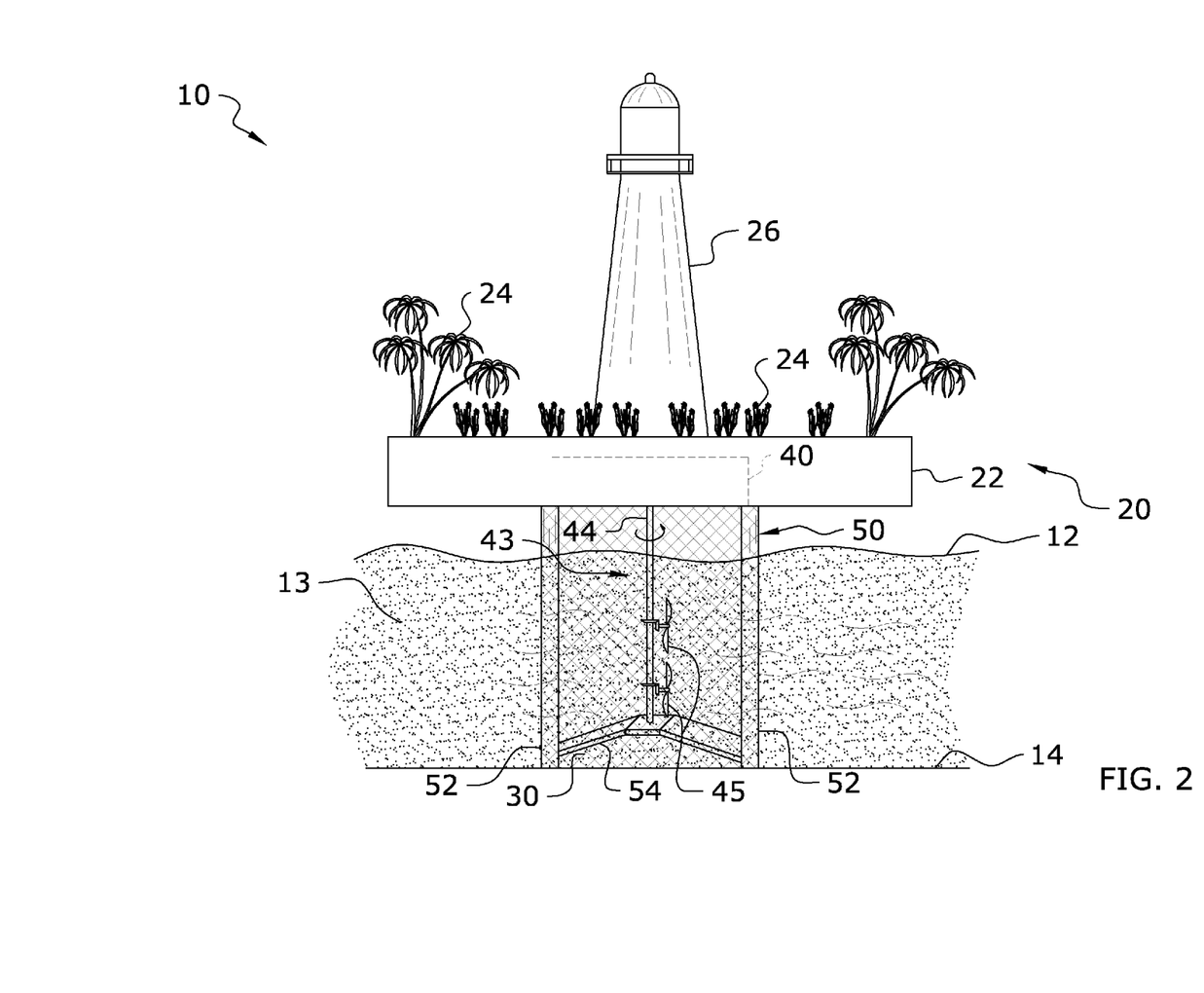
FIG. 2 is a second exemplary embodiment of the present invention.
Figure 4:
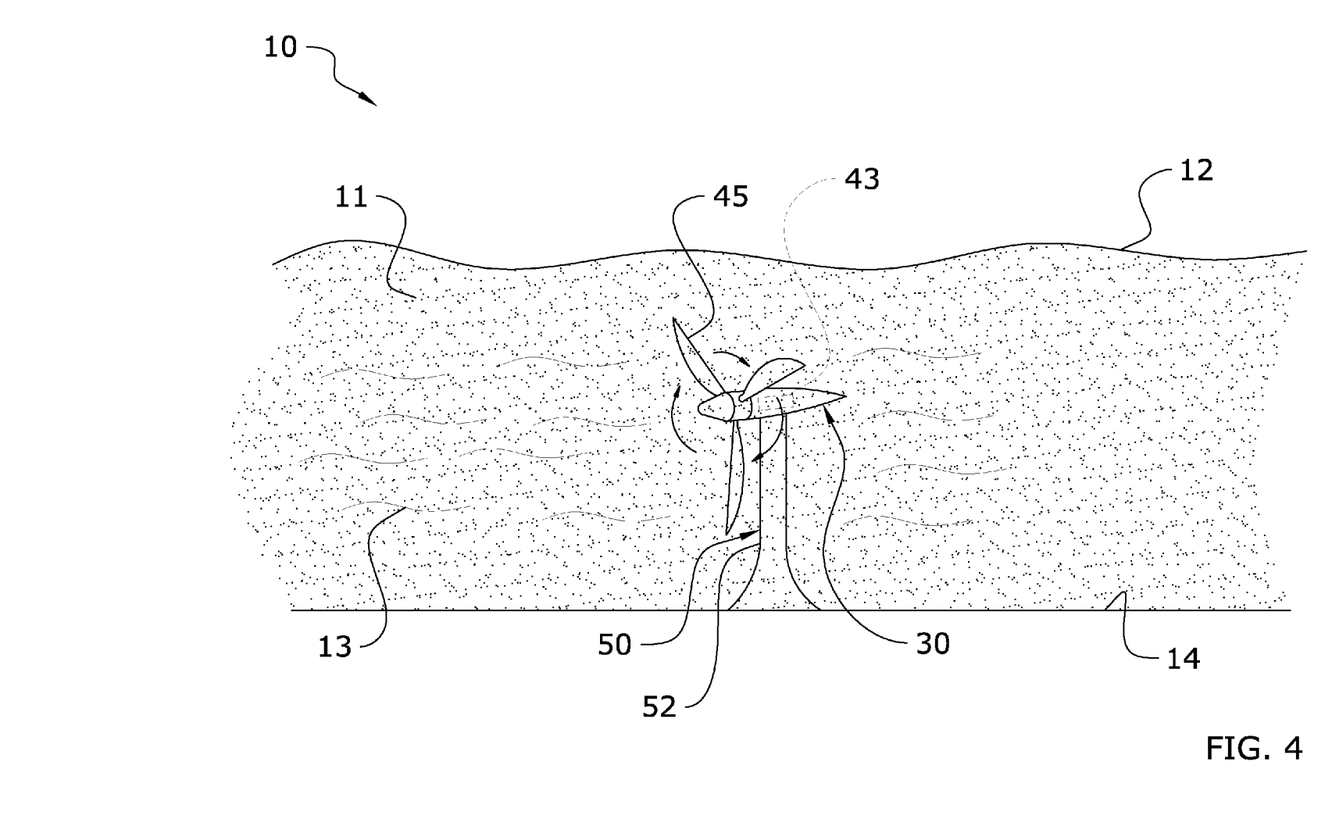
FIG. 4 is a third exemplary embodiment of the present invention.

Turning now descriptively to the drawings, in which similar reference characters denote similar elements throughout the several views, FIGS. 1, 2, and 4 illustrate a fixed electrical power generation system 10 for harvesting underwater currents, which comprises a platform 20 positioned above a water surface 12, an anchoring system 50 to secure the platform 20 to a floor 14 below a body of water 11, at least one turbine 43 extending below the platform 20 and at least one electrical generator 40 positioned upon the platform 20. The turbine 43 includes a rotatable shaft 44 and a plurality of rotatable blades 45 connected to the rotatable shaft 44. A first rotational axis of the rotatable shaft 44 is vertically oriented and wherein a second rotational axis of the plurality of rotatable blades 45 is horizontally aligned with an underwater current stream 13. The electrical generator 40 is mechanically connected to the shaft 44 of the turbine 43 to convert a rotational torque of the shaft 44 to electrical energy.

Figure 5:
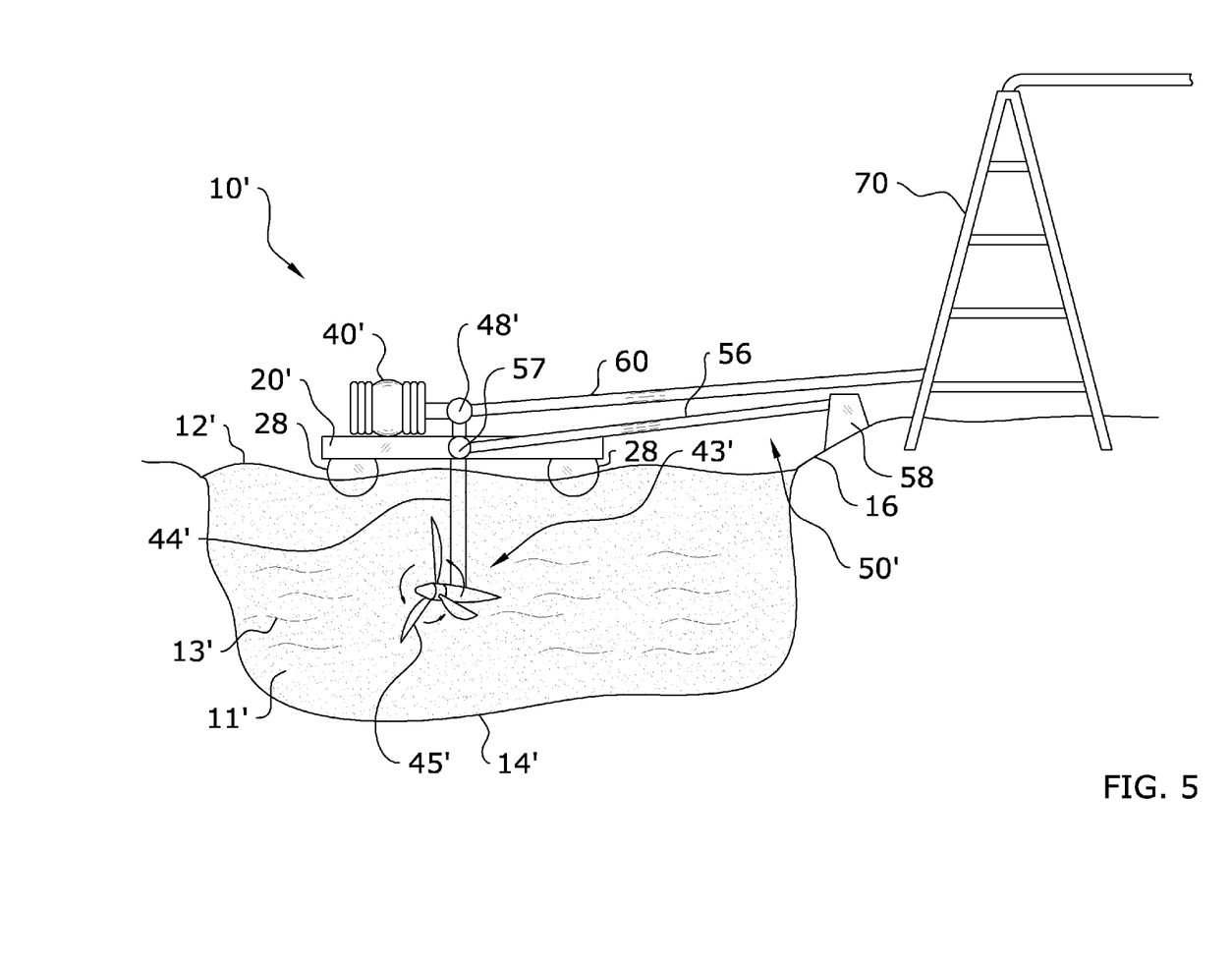
FIG. 5 is a fourth exemplary embodiment of the present invention.
Figure 6:
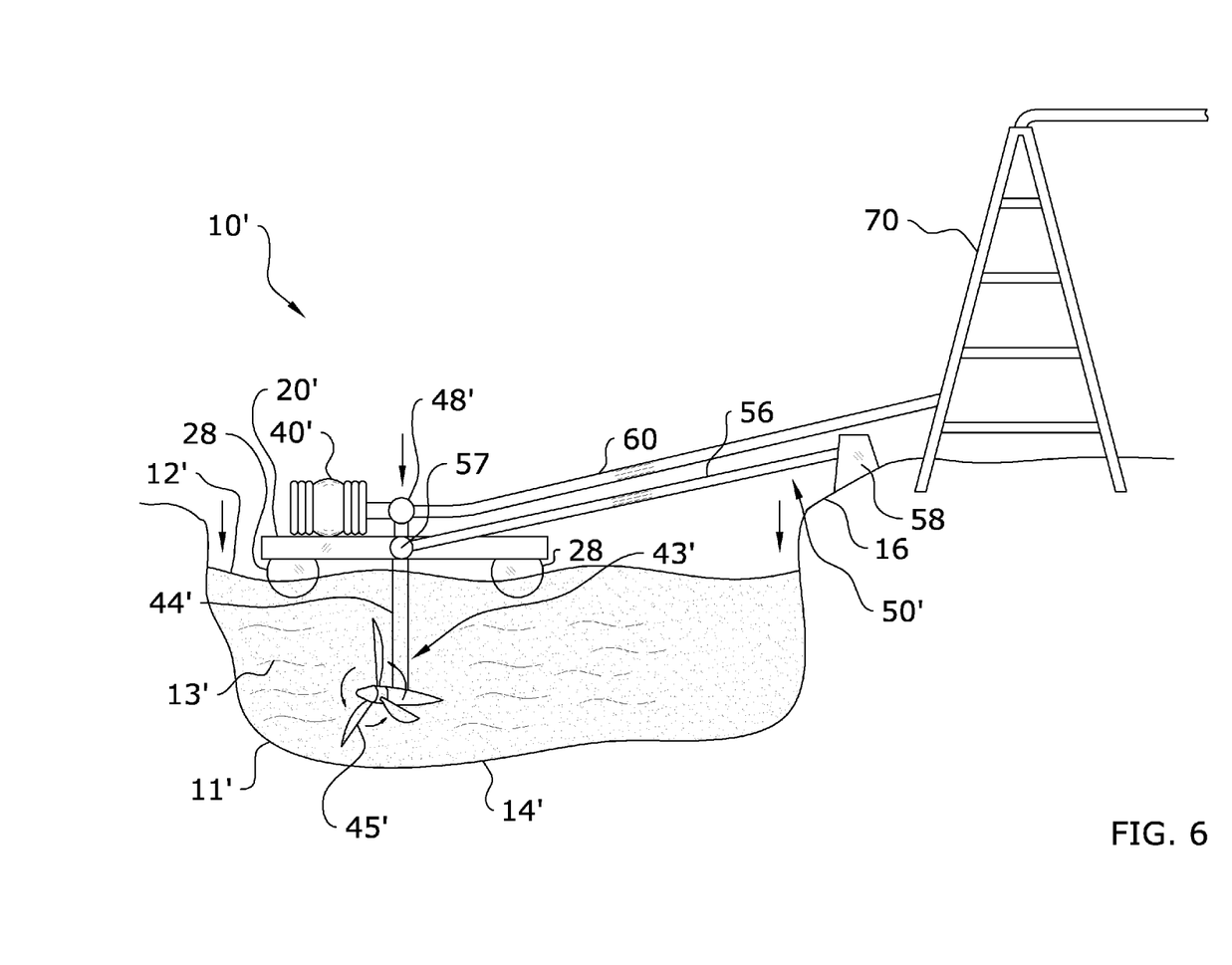
FIG. 6 is the fourth exemplary embodiment of the present invention showing the platform lowering with water levels.

The new embodiments are illustrated in FIGS. 5 through 8 and represent a floating or movable electrical power generation system 10' for harvesting underwater currents such as usually river currents; however the floating electrical power generation system 10' may be used to harvest currents from lakes, oceans, etc. as well. The system 10' generally includes an above water platform 20' to which a rotating turbine 43' assembly extends from that is immersed into the water 11', wherein the platform 20' is preferably secured to the embankment 16 by a stabilizing rod 56 and concrete casing securing structure 58 that allows the platform 20' to rise and fall with the level of the water 11' or other body of water as illustrated in FIGS. 5 and 6. The system 10' includes one or more flotation devices or members 28 attached to the platform 20' that each has a pontoon-type construction.

Figure 3:
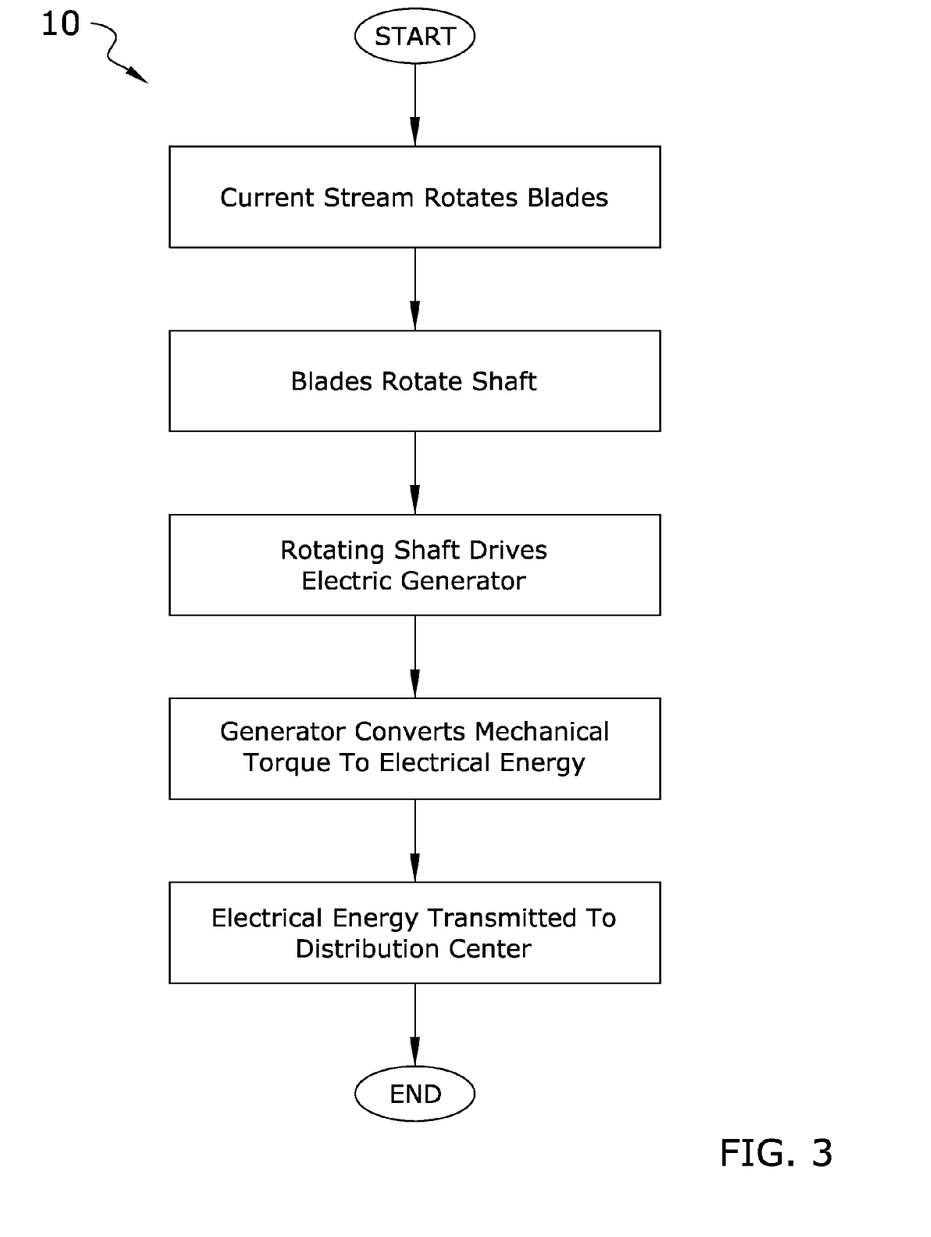
FIG. 3 is a flowchart illustrating a preferred process of the present invention.

A notable feature of the system 10' is the fact that the river current 13' does not need much force to create an appropriate level of usable electric power. Another is the shaft 44' is adjustable to be positioned at the level of the current stream 13'. The blades 45' are preferably connected to the shaft 44' in a similar manner as the oceanic version 10; however various embodiments may be appreciated. Another possible feature of the system 10' is its portability. The system 10' can be disconnected and pulled out of the river or body of water 11' and onto a flatbed trailer normally used for transporting road construction equipment. This feature has many desirable connotations in that systems 10' can respond to local and/or distant weather disasters such as floods that knock out power to a community or commercial undertakings. In other countries of the world that have seasonal flooding or droughts that either flood a river or leave the river bed dry due to drought, portable systems 10' can be delivered to places where water is plentiful and used to harness and send power to affected areas with no power. FIG. 3 describes an exemplary process of utilizing the invention applicable to both system 10 and system 10'.

B. Platform

FIGS. 1 and 2 illustrate a platform 20 in which the electrical generators 40 and all other electrical or mechanical equipment that is needed or desired to be used with the generators 40 is positioned upon. The platform 20 rests above the water surface 12 at a height great enough to prevent the platform 20 from being encompassed by waves from the body of water 11. The platform 20 may be comprised of concrete, metal or various other strong and durable materials. The platform 20 may be comprised of various sizes, such as 300×150 feet or various other sizes much larger or smaller. When using multiple platforms 20, the platforms are each preferably situated at least a distance of 50 to 100 miles apart from one another.

In FIGS. 1 and 2, the platform 20 is generally comprised of a flat surface; however it is appreciated that the platform 20 may include various types of terrain to mimic the appearance of an island or other aesthetically pleasing structure. The platform 20 may also include an enclosure 22 extending over a portion or the entire upper surface of the platform 20 to enclose the electrical generators 40 and other necessary equipment. The enclosure 22 may be comprised of various shapes and contours to provide an aesthetically pleasing configuration. The enclosure 22 is generally configured at a slanted angle in order to deflect strong winds to avoid damage to the platform 20 and the generators 50 inside. The enclosure 22 walls may be angled in various manners, such as but not limited to 45 or 60 degrees.

FIGS. 5 through 8 illustrate a different type of platform 20' that floats upon the water surface 12' via flotation devices 28 such that the platform 20' and flotation devices 28 rise and fall with the water surface level 12'. The platform 20' is generally a considerable amount smaller than the platform 20 illustrated in FIGS. 1 and 2. The platform 20' may take on various shapes such as square, rectangular, etc. The platform 20' is also formed of a solid construction such as to support the various mechanical and electrical components, yet light enough in weight to be supported at least partially above the water surface 12' in a floating manner by the flotation devices 28. The flotation devices 28 may have various shapes and structure; however the flotation devices 28 are generally comprised of elongated hollow and enclosed cylinders such as to extend along substantially the entire length of the platform 20' on each side to keep the platform 20' above the water surface 12' so that the top surface of the platform 20' is generally not submerged within the water 11'.

C. Foliage and Lighthouse

FIGS. 1 and 2 illustrate a mass amount of foliage 24 present upon the platform 20. The foliage 24 may be comprised of grasses, flowers, trees (e.g. Palm), waterfalls or various other types of natural foliage 24. The foliage 24 is meant to have the platform 20 and visible portion of the present invention from above the water surface 12 mimic an island or other aesthetically pleasing structure for individuals looking at the present invention from sea crafts or upon the mainland. The foliage 24 may be comprised of artificial or real (i.e. growing) foliage 24. The foliage 24 may also encompass the entire platform 20 and/or enclosure 22 or only a portion of the platform 20 and/or enclosure 22. Again, the foliage 24 is meant to mimic foliage 24 present upon a tropical island. The tropical island may be described as a land mass surrounded by a body of water including a plurality of trees, shrubs, other vegetation and may also include sand beaches and other naturally occurring foliage 24 or substances common to a tropical island. Although not illustrated, it is appreciated that foliage may be located upon the embodiment illustrated by FIGS. 5 through 8.

FIGS. 1 and 2 also illustrate a lighthouse 26 extending from the platform 20 or adjacent the platform 20. The lighthouse 26 provides many benefits, such as assisting in guiding traffic lanes through the body of water 11, providing navigation point for ships and also increasing the aesthetic structure of the present invention. Although not illustrated, it is appreciated a lighthouse may be located upon the embodiment illustrated by FIGS. 5 through 7.

D. Electrical Generators

The electrical generators 40 are generally positioned upon the platform 20 above the water surface 12 as illustrated in FIGS. 1 and 2. It is appreciated however that the electrical generators 40 may be positioned below the water surface 12. The present invention may include various numbers (e.g. 40, 50, etc.) of electrical generators 40 all which may be supported and desired to be utilized with the present invention. The number of generators 40 will generally be determined by the size of the platform 20 and the source of power from the underwater turbines 43. The torque from the shaft 44 of the turbines 43 will preferably be used to drive the generators 40 on the platform 20 to generate the electrical power. In one embodiment, the shaft 44 is directly connected to the generator 40 to directly drive the generator 40. The generators 40 may also be positioned along the wall of the enclosure 22 in that the platform 20 may not be large enough to accommodate all the generators 40.

In another embodiment, the shaft 44 of the turbine 43 may be mechanically connected to a transfer mechanism 48. The transfer mechanism 48 is comprised of a device to transfer mechanical power from the shaft 44 to the electrical generators 40. The transfer mechanism 48 receives the rotational torque from the vertical shaft 44 and transfers that rotational torque to the electrical generators 40 (in a horizontal or vertical manner). The rotational torque may be transferred between the transfer mechanism 48 and the generators 40 via various types of rotational connectors. Since the current from the ocean current stream 13 is often constant, a uniform amount of power may be generated by the electrical generators 40 from the turbines 43. Positioning the electrical generators 40 upon the platform 20 and above the water surface 12 affords for an easier and low-cost method of production. The generators 40 will be easier to install, easier to provide maintenance upon and the overall operation of the generators 40 will be more effective and economical.

The electrical generators 40 are comprised of a type that may work to convert the mechanical energy received from the turbines 43 and convert that mechanical energy to electrical energy. Various types of connectors, cables and other electrical and mechanical equipment common in the art may be utilized with the present invention to efficiently convert the mechanical energy from the turbines 43 to electrical energy by the generators 40 and transfer the converted electrical energy to shore (e.g. through cables, etc.) or another location in which the electrical energy may be distributed and utilized.

FIGS. 5 through 8 also illustrate an electrical generator 40' positioned atop the platform 20'. It is appreciated that a similar generator types as illustrated in FIGS. 1 and 2 and as previously described may be used with the embodiments of FIGS. 5 through 8. The system 10' can provide power using one or more generators 40' per platform 20'. The transfer mechanism 48' sends the rotation movement from the turbine 43' to a generator 40', wherein rotational speed of the blades or paddles 45' of the turbine 43' is directly proportional to the flow of the water in the river or other body of water 11'. Preferably the transfer mechanism 48' receives a first rotational torque rotating within a horizontal plane (such that the axis is vertical) and transfers the first rotational torque to a second rotational torque rotating within a vertical plane (such that the axis is horizontal) that is received by the electrical generator 40'. The generator 40' transforms the hydrokinetic power to electrical energy then sends the generated power to shore via transfer lines or cables 60 for distribution by the electrical grid system 70, which is preferably land-based and may include or more towers as illustrated.

E. Turbine

FIGS. 1 and 2 illustrate turbines 43 extending vertically downward from the platform 20 within the body of water 11 and toward the ocean current stream 13, wherein the turbines 43 are positioned to capture the kinetic energy from the ocean current streams 13. The turbines 43 generally include a shaft 44 extending vertically downward from the platform 20 to a location that intersects the ocean current streams 13 that are to be utilized to capture energy. Rotatably extending from the shaft 44 is a plurality of blades 45 that rotate from engaging the ocean current stream 13. As the blades 45 are rotated via the current stream 13, the blades 45 transfer the rotational torque to the shaft 44 which in turn transfers the rotational torque to the generators 40 to drive the generators 40. The rotational direction of the shaft 44 is thus generally perpendicular to the rotational direction of the blades 45. A first rotational axis of the rotatable shaft 44 is vertically oriented and a second rotational axis of the plurality of rotatable blades 45 is horizontally aligned.

It is appreciated that multiple sets of blades 45 may be rotatably connected upon a single shaft 44. The multiple sets of blades 45 may be vertically offset or horizontally offset from one another with respect to the shaft 44. The blades 45 also preferably include a substantially large surface area as shown in FIG. 1 so as to be more cost effective and better grasp the underwater currents 13. The blades 45 extend along a major portion of the length of the shaft 44. The large surface area of the blades 45 resembles a paddle-wheel in the preferred embodiment.

In one embodiment, the rotating torque of the blades 45 is transferred to the electrical generators 40 to produce the electrical energy via the blades 45 causing the shaft 44 to rotate, wherein the shaft 44 is directly connected to the generator 40 rotor of the generator 40. In another embodiment, as stated previously, the shaft 44 may be directly connected to a transfer mechanism 48 that distributes the rotational torque outwards to a plurality of generators 40 surrounding the transfer mechanism 48. In other embodiments, the rotational torque of the blades 45 may be transferred to the generator 40 via various other mechanical components, such as connectors or cables.

The turbines 43 may also be comprised of standard wind power generators 40 that are commonly used on land to capture wind, only inverted to extend from the platform 20 to capture ocean currents from the current stream 13. It is also appreciated that in an alternate embodiment, the turbines 43 may horizontally extend directly within the ocean current stream 13. It is also appreciated that a screen 30 surrounds the turbines 43 underwater to prevent the turbines 43 from coming into contact with aquatic life (e.g. fish, sharks, etc.).

FIGS. 5 through 8 illustrate a singular turbine 43' extending vertically downward from the platform 20' and including a lengthwise-adjustable shaft 44' and rotating blades, paddles, or other elements 45' upon the shaft 44'. It is appreciated that a similar turbine types as illustrated in FIGS. 1, 2, and 4 and as previously described may be used with the embodiments of FIGS. 5 through 8. It is also appreciated that more turbines may be used in the embodiment detailed on FIGS. 5 through 8 according to the size of the platform 20' and the river 11'. The shafts 44' are adjustable to accommodate for different river floor 14' depths and different depths at which the current 13' most strongly flows.

F. Anchoring System

FIGS. 1 and 2 illustrate an anchoring system 50 to securely mount the platform 20 to the ocean floor 14. The anchoring system 50 prevents the platform 20 from floating or being tossed during contact with extreme waves, such as during a hurricane. One location in which the present invention is desired to be utilized is the Gulf Stream off of Florida which experiences many hurricanes. For this reason, it is important for the platform 20 to be securely mounted to the ocean floor 14.

The anchoring system 50 may be comprised of various configurations all which stabilize the platform 20 and is strong enough to withstand impact from various types of natural disasters (e.g. hurricanes). The anchoring system 50 is comprised of a plurality of support legs 52 extending vertically downward from the platform 20 and within the ocean floor 14 to a proper depth in which the support legs 52 are stabilized. The support legs 52 may be comprised of various strong and durable materials, such as but not limited to concrete or metal. At least one cross support 54 also preferably connects the anchoring system 50 to the shaft 45 of the turbines 43 to stabilize the turbines 43 within the body of water 11.

Figure 7:
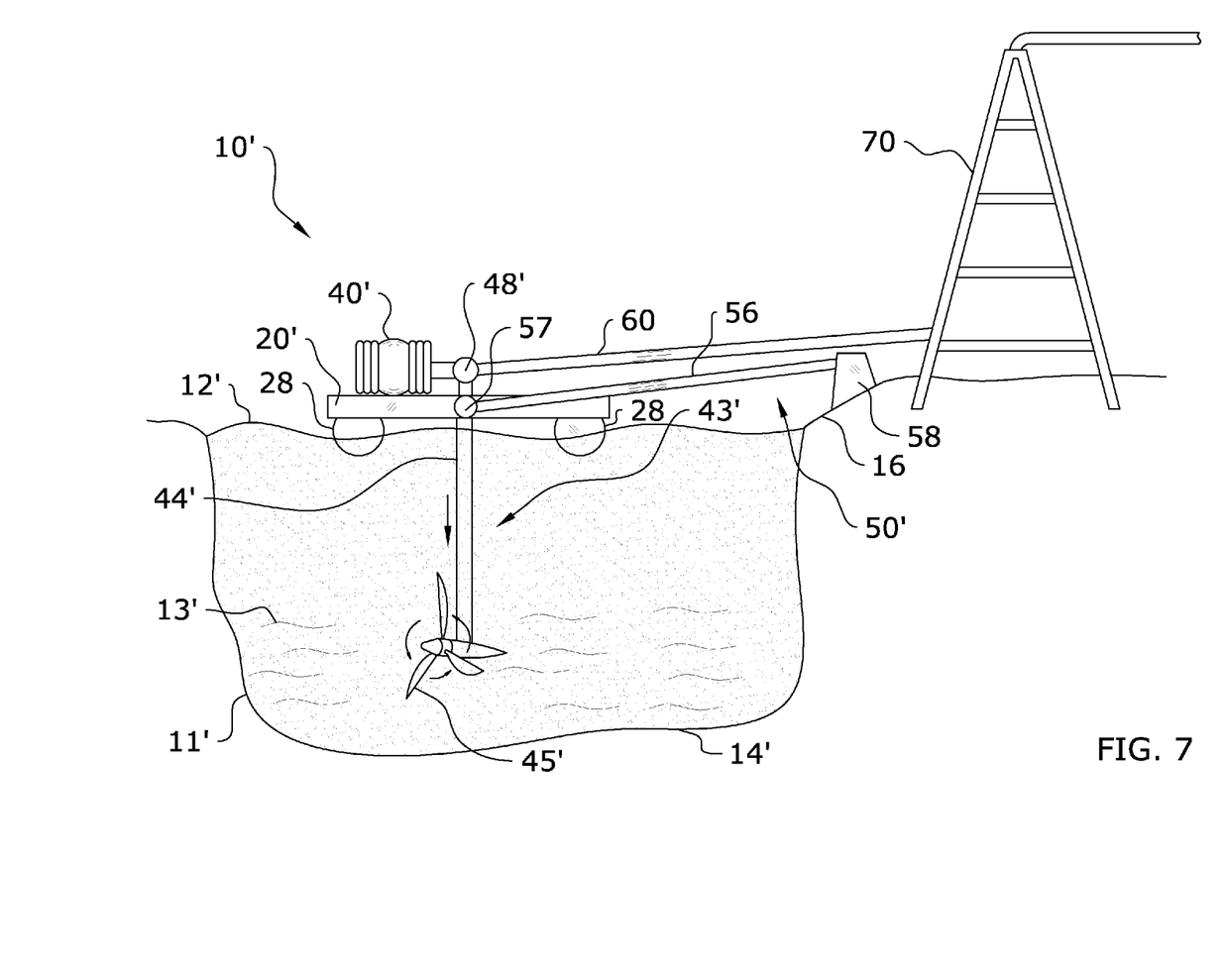
FIG. 7 is the fourth exemplary embodiment of the present invention illustrating the shaft of the turbine being adjusted in length.
Figure 8:
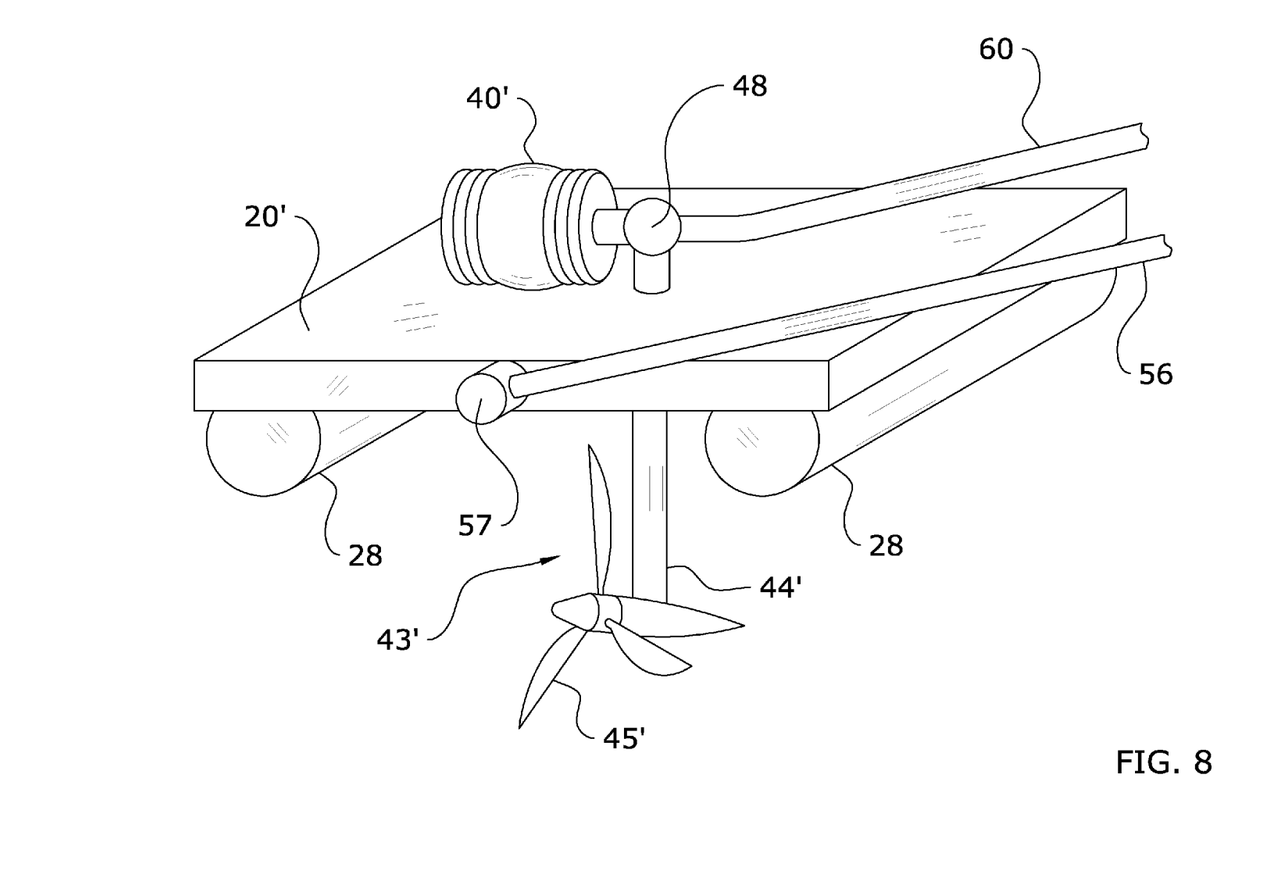
FIG. 8 is an upper perspective view of the fourth exemplary embodiment of the present invention.

FIGS. 5 through 7 illustrate an anchoring system 50' in which the platform 20' is secured to the embankment 16 or shore via a stabilizing rod 56 in a way such as to permit vertical adjustability of the platform 20'. The first end of the stabilizing rod 56 is generally pivotally secured to the platform 20' or other supporting structure 57 upon the platform 20' and the opposite, second end of the stabilizing rod 56 is secured to a securing structure 58 upon the embankment 16 or solid ground on the side of the river 11'. The securing structure 58 upon the embankment 16 generally also permits for the stabilizing rod 56 to be pivotally connected thereto, such that as the rising and falling water surface 12' of the river 11' causes the platform 20' to rise and fall and thus the stabilizing rod 56 to pivot. The stabilizing rod 56 ensures that the platform 20' remains in place and does not float down the river 11' with the current. It is appreciated that more stabilizing rods may be used in areas of high current.

G. Operation of Embodiment of FIGS. 1 and 2

In use, the turbines 43, electrical generators 40, and other electrical and mechanical equipment function to generate electrical energy from the ocean currents (e.g. within the Gulf Stream, etc.). In one embodiment, the ocean currents from the current stream 13 rotate the blades 45, which in turn rotate the shaft 44 which subsequently dives the electrical generator 40. The electrical energy generated by the generator 40 is transferred to a distribution center to be utilized by the public. The foliage 24 and lighthouse 26 upon the platform 20 create an aesthetically pleasing structure so as to hide many of the generators 40 and other components that are not deemed aesthetically pleasing. It is appreciated that the present invention may be positioned within various types of bodies of water 11, such as but not limited to oceans, gulfs, lakes, seas, rivers, bays, channels or any body of water with underwater current streams 13.

H. Operation of Embodiment of FIGS. 5 through 8

The embodiment illustrated in FIGS. 5 through 8 operates similarly to the embodiment of FIGS. 1, 2, and 4, except that the platform 20' is permitted to float upon the water surface 12' via flotation devices 28. The embodiment of FIGS. 5 through 8 also permits for much greater portability whereas the platform 20' rises and falls with water surface levels 12' of the river 11' and because of the use of the system 10' in a river affords for use in a greater number of locations.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An electrical power generation system for harvesting underwater river currents, comprising:
    at least one flotation member;
    a platform connected to said flotation member such that said platform is supported at least partially above a water surface of a river;
    at least one turbine extending below said platform, wherein said at least one turbine is positioned within an underwater current stream, wherein said at least one turbine includes a shaft and a plurality of rotatable elements, wherein said shaft is adjustable in length;
    at least one electrical generator positioned upon said platform, wherein said at least one electrical generator is mechanically connected to said at least one turbine to convert a rotational torque of said at least one turbine to electrical energy; and
    an anchoring means to secure said platform to an embankment such as to permit said platform to rise and fall with the water surface of the river.

2. The electrical power generation system of claim 1, wherein said at least one flotation member is comprised of a first flotation member connected to a first side of said platform and a second flotation member connected to a second side of said platform.

3. The electrical power generation system of claim 2, wherein said first flotation member and said second flotation member are each comprised of a pontoon-shaped structure.

4. The electrical power generation system of claim 1, wherein said plurality of rotatable elements are each comprised of a blade structure.

5. The electric power generation system of claim 4, wherein a first rotational axis of said shaft is vertically oriented and wherein a second rotational axis of said plurality of rotatable elements is horizontally oriented.

6. The electric power generation system of claim 5, wherein said at least one turbine is comprised of an inverted wind turbine configuration.

7. The electrical power generation system of claim 1, including one or more power distribution cables connecting said at least one electrical generator to a land-based electrical grid.

8. The electrical power generation system of claim 1, wherein said anchoring means comprises:
    a first securing structure connected to said platform;
    a second securing structure supported upon the embankment; and
    a stabilizing rod having a first end and a second end, said first end being pivotally connected to said first securing structure and said second end being pivotally connected to said second securing structure such that said stabilizing rod pivots with a vertical adjustment of said platform caused by a rise and fall of the level of the water surface of the river.

9. The electrical power generation system of claim 8, wherein said stabilizing rod is comprised of a rigid structure.

10. The electric power generation system of claim 1, including a transfer mechanism to transfer a vertical rotational torque of said at least one turbine to a horizontal rotational torque received by said at least one electrical generator.

11. An electrical power generation system for harvesting underwater river currents, comprising:
   a flotation means comprised of a first flotation member and a second flotation member;
   wherein said first flotation member and said second flotation member are each comprised of a pontoon-shaped structure;
   a platform connected to said flotation means such that said platform is supported at least partially above a water surface of a river;
   at least one turbine extending below said platform, wherein said at least one turbine is positioned within an underwater current stream;
   at least one electrical generator positioned upon said platform, wherein said at least one electrical generator is mechanically connected to said at least one turbine to convert a rotational torque of said at least one turbine to electrical energy; and
   an anchoring system having a first securing structure connected to said platform, a second securing structure supported upon the embankment, and a rigid stabilizing rod having a first end and a second end;
   wherein said first end is pivotally connected to said first securing structure and wherein said second end is pivotally connected to said second securing structure such that said stabilizing rod pivots with a vertical adjustment of said platform caused by a rise and fall of the level of the water surface of the river.

12. The electrical power generation system of claim 11, wherein said at least one turbine includes a shaft and a plurality of rotatable elements.

13. The electrical power generation system of claim 12, wherein said shaft is adjustable in length.

14. The electrical power generation system of claim 13, wherein said plurality of rotatable elements are each comprised of a blade structure.

15. The electric power generation system of claim 14, wherein a first rotational axis of said shaft is vertically oriented and wherein a second rotational axis of said plurality of rotatable elements is horizontally oriented.

16. The electric power generation system of claim 15, wherein said at least one turbine is comprised of an inverted wind turbine configuration.

17. The electrical power generation system of claim 11, including one or more power distribution cables connecting said at least one electrical generator to a land-based electrical grid.

18. An electrical power generation system for harvesting underwater currents, comprising:
   a flotation means comprised of a first flotation member and a second flotation member;
   wherein said first flotation member and said second flotation member are each comprised of a pontoon-shaped structure;
   a platform connected to said flotation means such that said platform is supported at least partially above a water surface of a body of water;
   at least one turbine extending below said platform, wherein said at least one turbine is positioned within an underwater current stream;
   wherein said at least one turbine includes an adjustable-length shaft and a plurality of rotatable blades;
   wherein a first rotational axis of said shaft is vertically oriented and wherein a second rotational axis of said plurality of rotatable blades is horizontally oriented;
   at least one electrical generator positioned upon said platform, wherein said at least one electrical generator is mechanically connected to said at least one turbine to convert a rotational torque of said at least one turbine to electrical energy;
   one or more power distribution cables connecting said at least one electrical generator to a land-based electrical grid; and
   an anchoring system having a first securing structure connected to said platform, a second securing structure supported upon the embankment, and a rigid stabilizing rod having a first end and a second;
   wherein said first end is pivotally connected to said first securing structure and wherein said second end is pivotally connected to said second securing structure such that said stabilizing rod pivots with a vertical adjustment of said platform caused by a rise and fall of the level of the water surface of the body of water.

* * * * *